United States Patent
Cristante et al.

(10) Patent No.: US 6,742,615 B2
(45) Date of Patent: Jun. 1, 2004

(54) PRE-ASSEMBLED FRONT UNIT FOR MOTOR VEHICLES

(75) Inventors: Luigi Cristante, Alpignano (IT); Eustachio Masciandara, Rivoli (IT)

(73) Assignee: Denso Thermal Systems SpA, Turin (IT)

( * ) Notice: Subject to any disclaimer, the term of this patent is extended or adjusted under 35 U.S.C. 154(b) by 0 days.

(21) Appl. No.: 10/011,773

(22) Filed: Dec. 11, 2001

(65) Prior Publication Data

US 2002/0063003 A1 May 30, 2002

(51) Int. Cl.$^7$ .............................................. B60K 11/04
(52) U.S. Cl. ........................ 180/68.4; 165/67; 165/69; 165/140
(58) Field of Search .............................. 180/68.1, 68.2, 180/68.3, 68.4, 68.6; 296/194; 165/67, 69, 78, 140

(56) References Cited

U.S. PATENT DOCUMENTS

| | | | | |
|---|---|---|---|---|
| 4,579,184 A | * | 4/1986 | Hiramoto | 180/68.4 |
| 4,651,839 A | * | 3/1987 | Isobe | 180/68.4 |
| 4,770,234 A | * | 9/1988 | Hiraoka et al. | 165/69 |
| 5,271,473 A | * | 12/1993 | Ikeda et al. | 180/68.4 |
| 5,671,803 A | | 9/1997 | Tepas et al. | |
| 5,785,140 A | | 7/1998 | Suzuki et al. | |
| 6,237,676 B1 | | 5/2001 | Hasegawa et al. | |
| 6,260,609 B1 | | 7/2001 | Takahashi | |
| 2000/0119098 | | 9/2001 | Guyomard | |
| 2002/0056541 A1 | * | 5/2002 | Kokubunji et al. | 165/67 |

FOREIGN PATENT DOCUMENTS

| | | | |
|---|---|---|---|
| DE | 2557967 | | 6/1977 |
| DE | 3246583 | | 4/1984 |
| DE | 4028250 | * | 10/1991 |
| DE | 101 24 709 A1 | | 11/2001 |
| EP | 211253 | * | 2/1987 |
| EP | 1 067 005 A1 | | 1/2001 |
| JP | 59-202937 | * | 11/1984 |
| JP | 10-306993 | * | 11/1998 |
| JP | 2001-301474 | * | 10/2001 |
| JP | 2002-114025 | * | 4/2002 |
| JP | 2002-115992 | * | 4/2002 |
| JP | 2002-234349 | * | 8/2002 |
| JP | 2002-318090 | * | 10/2002 |

* cited by examiner

Primary Examiner—Bryan Fischmann
(74) Attorney, Agent, or Firm—Sughrue Mion, PLLC

(57) ABSTRACT

A pre-assembled front unit for motor vehicles comprising: a supporting structure (12) destined to be fastened to the front part of a vehicle, a condenser (16) and a radiator (18) connected to the supporting structure (12) and connection devices for fastening the condenser (16) and the radiator (18) to the supporting structure (12) in such a way that the condenser and the radiator can be removed separately. The supporting structure (12) supports a pair of interchangeable lower plates (40) each of which is equipped with positioning and fastening devices (46) engaging the corresponding devices (20, 26) on the condenser (16) and on the radiator (18) which can be disengaged by upward movement of the condenser (16) and of the radiator (18).

4 Claims, 3 Drawing Sheets

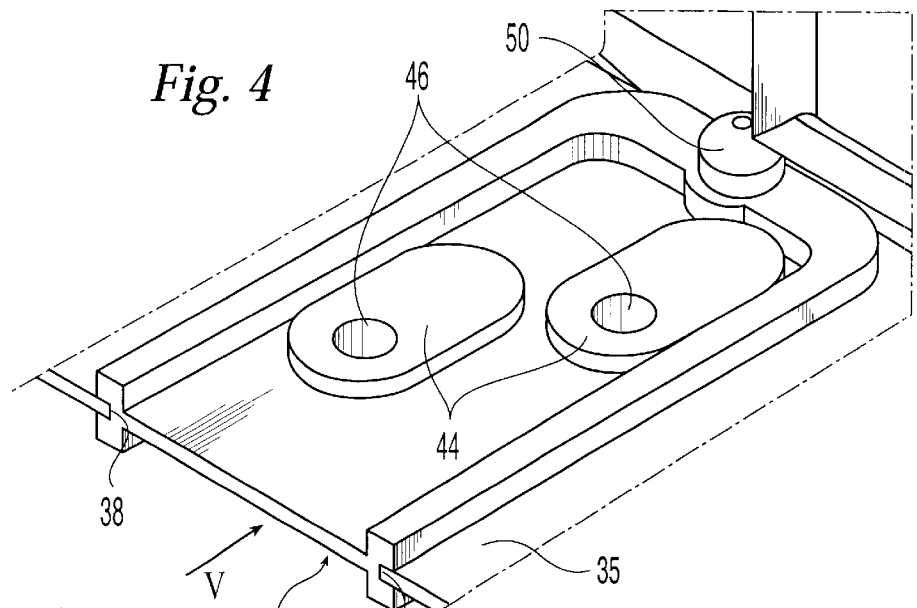
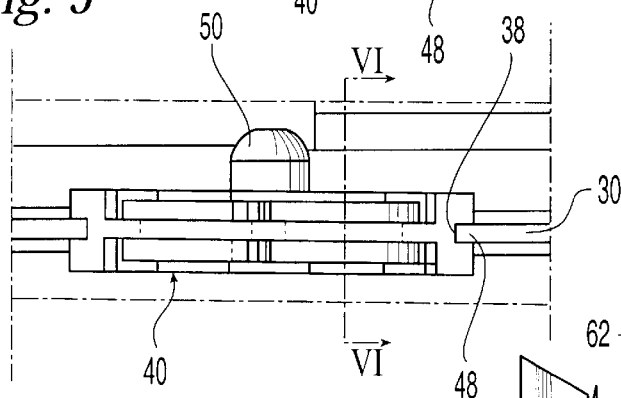
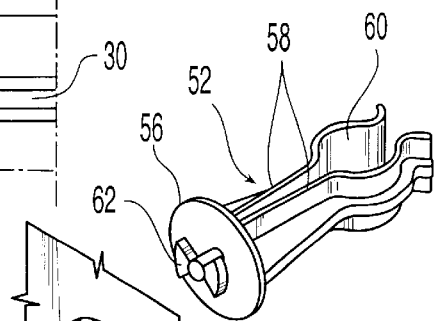
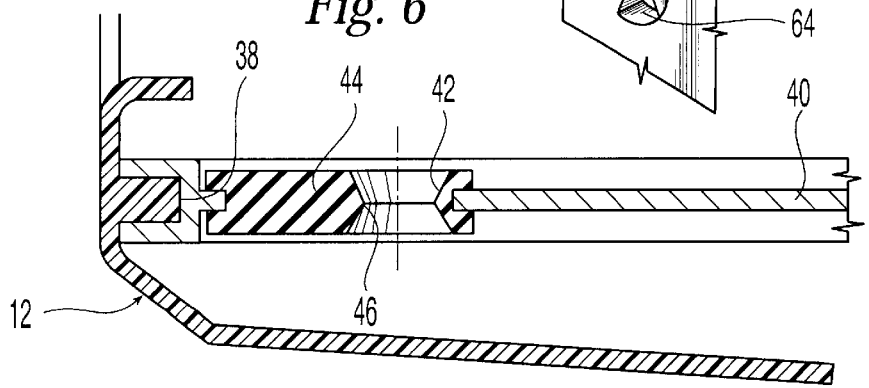

PRE-ASSEMBLED FRONT UNIT FOR MOTOR VEHICLES

BACKGROUND OF THE INVENTION

This invention relates to a pre-assembled front unit for motor vehicles comprising:

a supporting structure destined to be fastened to the front part of a vehicle, a condenser and a radiator connected to the supporting structure and connection devices for fastening the condenser and the radiator to the supporting structure in such a way that the condenser and the radiator can be removed separately one respect to the other by means of a movement from the bottom upwards.

This invention was developed specifically to satisfy the need of removing heat exchangers (condenser and radiator) from a motor vehicle upwards and separately and the need of adapting the front unit to different models of the same vehicle fitting different powertrain versions. Often, when the powertrain equipping the vehicle is changed, the distance between the heat exchangers of the front module and the chassis must be changed to account for the different clearance requirements and, consequently, the different layout of the components inside the engine compartment. This occurs specifically in the case of versions equipped with manual transmission, automatic transmission and diesel engine.

SUMMARY OF THE INVENTION

The scope of this invention is to provide a pre-assembled front unit for motor vehicles of the type described above which can be adapted to vehicles fitting different powertrains without the need of using different supporting structures for the different models.

BRIEF DESCRIPTION OF THE DRAWINGS

This invention will be better explained by the following detailed descriptions with reference to the accompanying figure as non-limiting example, whereas:

FIG. 4 is an enlarged scale perspective view of the part indicated by the arrow IV in FIG. 2, FIG. 5 is an elevated view according to the arrow V in FIG. 4, FIG. 6 is a partial view according to the line VI—VI in FIG. 5 and, FIG. 7 is an exploded perspective view of the detail indicated by an arrow VII in FIG. 2.

DETAILED DESCRIPTION OF THE INVENTION

Figure 1:
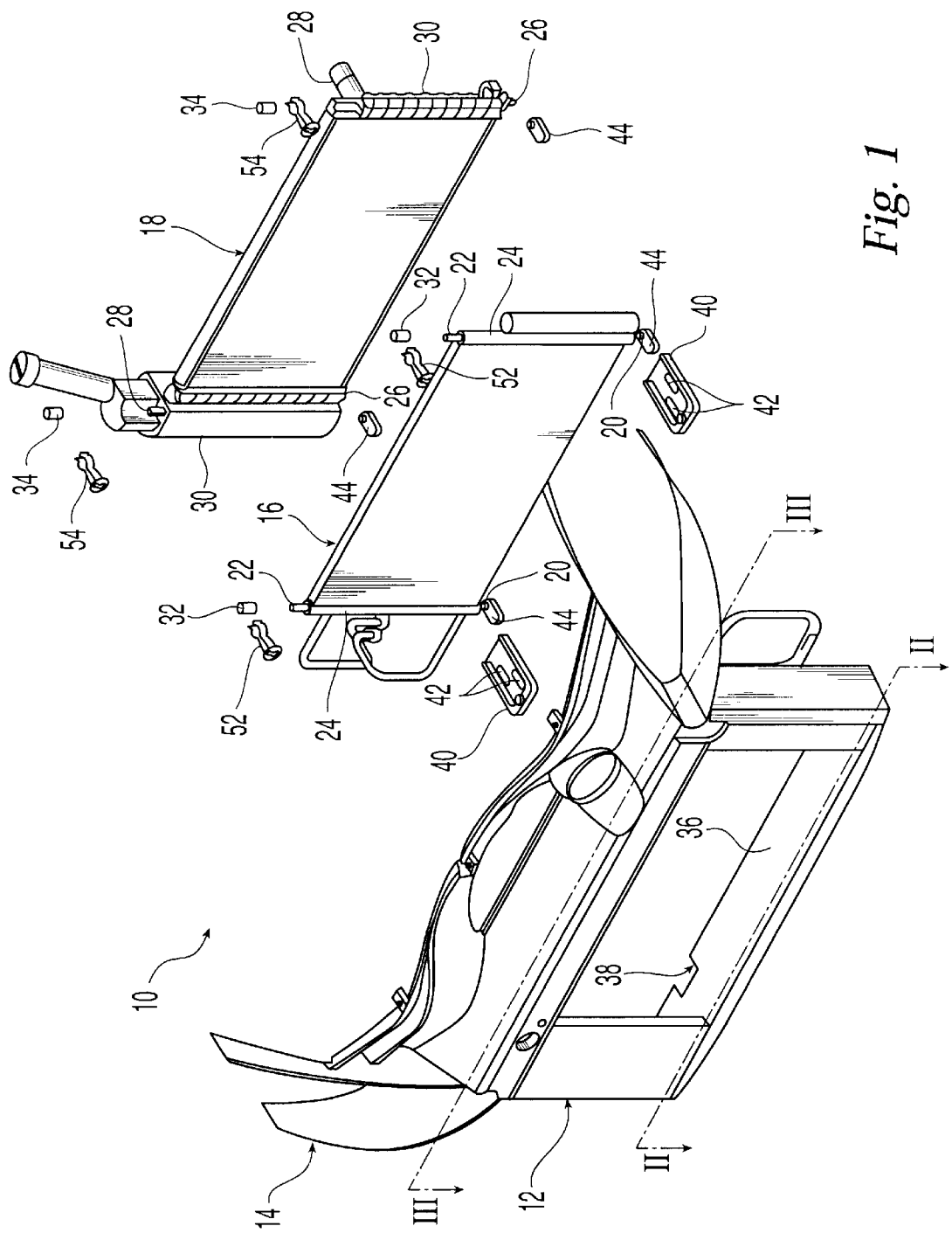
FIG. 1 is an exploded perspective view of the pre-assembled front unit according to this invention.
Figure 2:
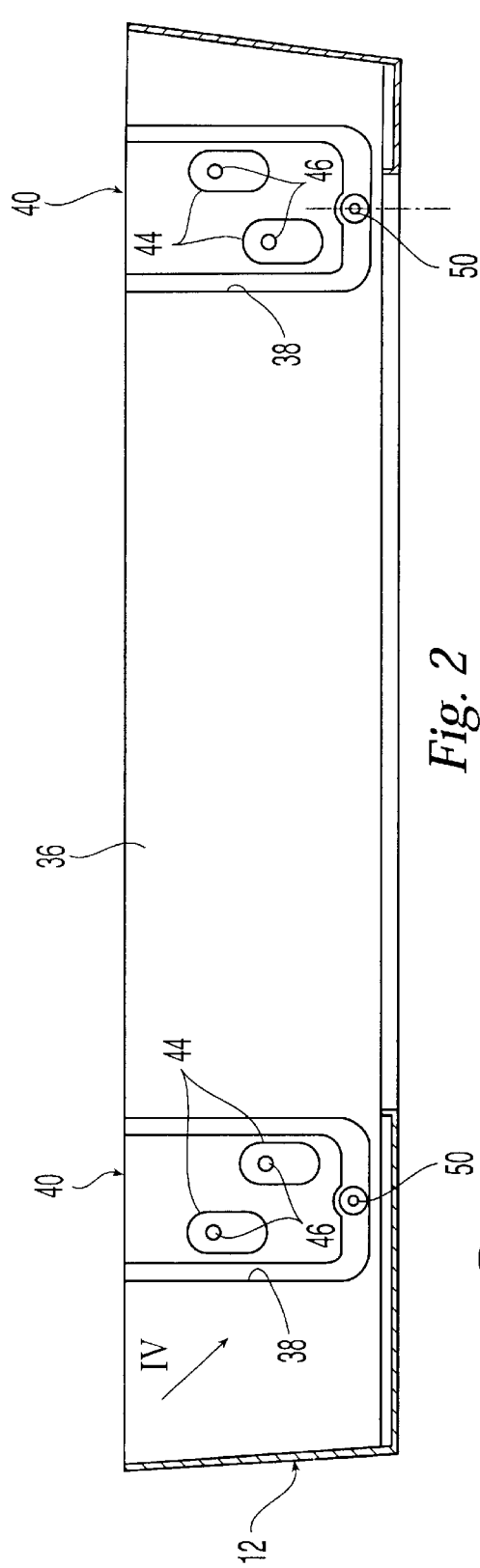
FIGS. 2 and 3 are schematic cross-sections according to the lines II—II and III—III in FIG. 1.
Figure 3:
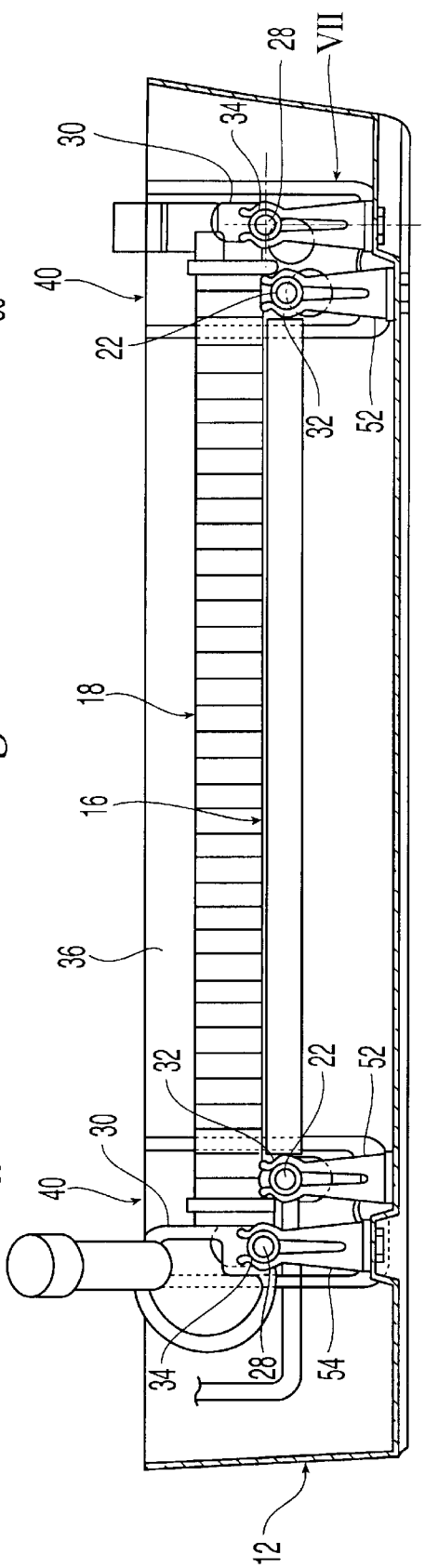

With reference to FIG. 1, number 10 indicates a pre-assembled unit for motor vehicles according to this invention. The front unit 10 comprises a supporting structure made of plastic material 12 which supports the various components of the pre-assembled unit and which is destined to be fitted on the front part of a motor vehicle. In FIG. 1, number 14 schematically indicates the upper front part of a chassis of a motor vehicle to which the supporting structure 12 is fastened in a conventional fashion.

The pre-assembled unit 10 comprises a condenser 16 which is part of an air conditioning system in the motor vehicle and a radiator 18 which is part of the cooling system of the internal combustion engine fitted in the vehicle. Moreover, the pre-assembled unit 10 comprises a manifold (not shown) supporting an electrical fan unit facing the surface of the radiator 18 facing outwards with respect to the engine compartment. The condenser 16 is equipped with a pir of lower pins 20 and a pair of upper pins 22 on a vertical axis. Preferably. The pins 20, 22 are either fastened to, or form an integral part with, the ends of a pair of tubular distributors 24. The radiator 18 is also equipped with a pair of lower of lower pins 26 and a pair of upper pines 28 on a vertical axis. Preferably, the pins 26, 28 form an integral part with the respective plastic material reservoirs 30. Elastomer bushings 32, 34 are preferably inserted on the upper pins 22 and 28 of the condenser 16 and the radiator 18.

With reference to the FIGS. 1, 2 and 4–6, the supporting structure 12 comprises a lower supporting base 36 equipped with a pair of seats 38 in which the respective lower supporting plates 40 are fitted. Each supporting plate 40 is equipped with a pair of holes 42 (FIG. 6) in which an elastomer material block 44 with a hole 46 is inserted. The holes 46 of which plate 40 receive the lower pins 20, 26 of the condenser and the radiator with a slight interference.

Each plate 40 is fastened in either a permanent or removable fashion to the supporting structure 12. In the example shown in the figures, each plate 40 has a groove 48 on the edge which is engaged by the edge of the seat 38. Fastening is achieved by means of a screw which extends through a hole crossing the supporting base 36 and engaging a projecting portion 50 formed on plate 40.

The supporting structure 12 supports two pairs of clips 52, 54 which engage the upper pins 22 and 28 of the condenser 16 and the radiator 18, respectively. As can be seen in particular in FIG. 7, each clip 52, 54 comprises a base 56 from which two deformable portions 58 project, said portions facing each other and defining a partially open seat 60 in which a respective pin 22, 28 is clipped by interposing the respective elastomer material bushing 32, 34. The base 56 of each clip 52, 54 is equipped with devices for fastening to the supporting structure 12. In the example shown in the figures, said fastening device have a bayonet coupling comprising an engaging portion 62 and a seat 64 formed in the supporting structure 12. The bayonet coupling 62, 64 is configured so to fasten the clip 52 to the supporting structure 12 solely by means of a rotation of 90 degrees after inserting the projecting portion 62 into the corresponding seat 64.

The condenser 16 and the radiator 18 are fastened to the supporting structure 12 by inserting the lower pins 20 and 26 downwardly into the holes 46 and then engaging the upper pins 22 and 28 in the respective clips 52, 54 by means of a forward tilting movement of the condenser 16 and the radiator 18. The condenser 16 and the radiator 18 can be removed separately one from the other from the supporting structure 12 by releasing the upper pins 22, 28 from the clips 52, 54 and tilting the condenser 16 and the radiator 18 in the opposite direction and then removing them by lifting them upwardly to remove the pins 20 and 26 from the holes 46.

The pre-assembled front unit according to this invention can be fitted on motor vehicles fitting different powertrains which require a relative distance between the heat exchangers 16, 18 and the supporting structure 12 according to the different clearance requirements of the powertrain. In order to satisfy this requirement, the structure according to this invention will remain unchanged for the various models with the sole replacement of the interchangeable plates 40 and the interchangeable clips 52, 54. This is because the position of the condenser 16 and the radiator 16 can be varied with respect to the supporting structure 12 while maintaining unchanged the shape and dimensions of the supporting structure by changing the position of the holes 46 and the seats 60. This entails a considerable cutting of costs for tooling since different dies for making different supporting structures for vehicle fitting different powertrains are no longer required.

What is claimed is:

1. A pre-assembled front unit for motor vehicles comprising:
   a supporting structure adapted to be fastened to a front part of a vehicle,
   a condenser and a radiator connected to the supporting structure and
   connection devices for fastening the condenser and the radiator to the supporting structure in such a way that the condenser and the radiator can be removed separately by an upward movement from the supporting structure,
   wherein the supporting structure supports a pair of interchangeable lower plates each of which is equipped with positioning and fastening devices engaging corresponding devices on the condenser and on the radiator which can be disengaged by an upward movement of the condenser and the radiator away from said lower plates.

2. The front unit according to the claim 1, wherein the supporting structure comprises two pairs of interchangeable clips engaging respective upper positioning and fastening devices on the condenser and on the radiator.

3. The front unit according to claim 2, wherein each of said clips comprises a partially open seat which clips onto a respective positioning and fastening pin in the upper part of the condenser and the radiator.

4. The front unit according to claim 1, wherein each of said lower plates comprises a pair of deformable material blocks each having a hole for receiving a lower positioning and fastening pin on the condenser and on the radiator.

* * * * *